United States Patent
Ma et al.

(10) Patent No.: US 10,053,626 B2
(45) Date of Patent: Aug. 21, 2018

(54) METHODS OF FABRICATING PDLC THIN FILMS (71) Applicant: Shenzhen China Star Optoelectronics Technology Co., Ltd., Shenzhen (CN)

(72) Inventors: Chao Ma, Shenzhen (CN); Yungjui Lee, Shenzhen (GD)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 180 days.

(21) Appl. No.: 14/912,605

(22) PCT Filed: Dec. 24, 2015

(86) PCT No.: PCT/CN2015/098637
§ 371 (c)(1),
(2) Date: Feb. 18, 2016

(87) PCT Pub. No.: WO2017/080035
PCT Pub. Date: May 18, 2017

(65) Prior Publication Data
US 2017/0260454 A1  Sep. 14, 2017

(30) Foreign Application Priority Data

Nov. 9, 2015  (CN) .......................... 2015 1 0755739

(51) Int. Cl.
C08K 3/00 (2018.01)
C09K 19/54 (2006.01)
G02F 1/1334 (2006.01)
C08L 67/02 (2006.01)
C09K 19/52 (2006.01)

(52) U.S. Cl.
CPC .......... C09K 19/544 (2013.01); G02F 1/1334 (2013.01); C08L 67/02 (2013.01); C09K 2019/521 (2013.01); C09K 2019/546 (2013.01); G02F 2001/13345 (2013.01)

(58) Field of Classification Search
CPC ............ C09K 19/544; C09K 2019/546; C09K 2019/521; G02F 1/1334
USPC ......................................................... 524/424
See application file for complete search history.

(56) References Cited

U.S. PATENT DOCUMENTS

2016/0259224 A1* 9/2016 Ozyilmaz ............... G02F 1/155

* cited by examiner

Primary Examiner — Hui H Chin
(74) Attorney, Agent, or Firm — Leong C. Lei (57) ABSTRACT The present provides a method of fabricating a polymer dispersed liquid crystal (PDLC) thin film. The method of fabricating the PDLC of the present application forms the first solution by mixing the liquid crystal and the graphene nanoparticles; prepares the prepolymer by using the citric acid and the 1,8-octanediol, or the citric acid, the 1,8-octanediol and the 1,8-octanediol; forms the second solution by dissolving the prepolymer in the anhydrous ethanol; then obtains the mixture prepolymer of the polymer dispersed liquid crystal and the graphene nanoparticles by mixing and uniformly stirring the first solution and the second solution; and obtains the PDLC thin film after the mixture prepolymer is polymerized for several days.

16 Claims, 5 Drawing Sheets

METHODS OF FABRICATING PDLC THIN FILMS

FIELD OF THE INVENTION

The present application relates to display technical field, specifically to a method of fabricating a PDLC thin film.

BACKGROUND OF THE INVENTION

A thin film transistor-liquid crystal display (TFT-LCD) includes a color filter substrate (CF Substrate) and a thin film transistor substrate (TFT Substrate), and transparent electrodes are provided on relative inner sides of the substrates. A layer of liquid crystal (LC) molecules are interposed between the two substrates. The display purpose of the liquid crystal display is achieved through an electric field controlling an orientation of the liquid crystal molecule to change polarization state of light, and by a polarizer implementing transmittance and barrier of light path.

It can be said that no matter current large, medium and small size display, LCD occupy absolute market thereof. In the current LCD application market, terminal display equipment of shopping malls, supermarkets, hotel lobbies, theaters, education, health care and other public places of crowd gathering get more and more demand and application, which are growing at an annual rate of more than 30% growth.

On the other hand, polymer dispersed liquid crystal (PDLC) as a LCD dimmer has been widely concerned and used. PDLC is a material which is obtained by mixing low molecular liquid crystal and prepolymer, forming micron level liquid crystal droplets uniformly dispersed in a polymer network through polymerization under a certain condition, and obtaining electro-optical response characteristic by utilizing dielectric anisotropy of the liquid crystal molecules, its main work is to have certain gray between scattering state and transparent state. A PDLC liquid crystal display has a lot of advantages, such as no need of a polarizer and an alignment layer, a simple fabrication process, easy to fabricate a large area flexible display, etc.; now, it has obtained wide applications in optical modulators, thermal sensitive and pressure sensitive devices, electronic control glass, light valves, projection displays, electronic books, and other aspects. The work principle thereof is that regular electric field cannot form between films without an applied voltage, optical axis orientations of liquid crystal micro particles are random and show disorder state, and an effective refractive index n0 thereof does not match a refractive index np of the polymer. Incident light ray is strongly scattered, the thin film presents opaque or semitransparent. After applying the external voltage, the light axis of the liquid crystal micro particles are arranged perpendicular to a surface of the thin film, i.e. identical to the electric field direction. An ordinary refractive index of the micro particles substantially matches the refractive index of the polymer, there is no obvious interface, and it constitutes a substantially uniform medium, so scattering the incident light does not occur, and the thin film presents transparent. Therefore, PDLC has a characteristic of light switch when it is driven by the applied voltage; and with increasing the applied voltage, the degree of transparency increases along a certain curve type.

Additionally, graphene, which begins to reveal conspicuous application in TFT-LCD, is a major scientific discovery, following fullerene and carbon nanotube, as another mile stone in the nanomaterial research field. The graphene is a two-dimensional atomic crystal constituted by single atomic layer of linking carbon atoms with hybridized sp orbit, a basic structural unit thereof is the most stable six-membered ring structure of benzene, when electrons in the graphene move in the orbit, scattering will not occur due to lattice defects or introduction of foreign atoms. Due to the presence of $\pi$ orbit in a plane of the graphene sheet, the electrons can freely move in the crystal, so that the graphene has very excellent electron transport properties. The graphene further has many special properties, such as zero energy gap, anomalous quantum Hall effect, the Landau quantum property, etc., so the graphene attracts more and more people in the flat display industry to research applications thereof.

SUMMARY OF THE INVENTION

An aspect of the present application is to provide a method of fabricating a PDLC thin film, which can reduce a driving voltage of the polymer dispersed liquid crystal, increase a response speed, and a size and a thickness of the obtained PDLC thin film are adjustable.

For achieving the above aspect, the present application provides a method of fabricating a PDLC thin film, including steps as follows:

step 1, providing liquid crystal and graphene nanoparticles; mixing and uniformly stirring the graphene nanoparticles and the liquid crystal in accordance with a mass ratio in 0.1-20:100 to obtain a first solution;

step 2, providing citric acid and 1,8-octanediol; putting the citric acid and the 1,8-octanediol into a round bottom flask in accordance with a molar ratio of 1:1, under conditions of nitrogen atmosphere and atmospheric pressure, stirring in 120-150° C., melting and reacting until difficult to magnetically stir, that is, when nearing a gel point, to stop the stirring, to obtain a prepolymer having a certain molecular weight; or providing citric acid, 1,8-octanediol and 1,2-propanediol; putting the citric acid, the 1,8-octanediol and the 1,2-propanediol into a round bottom flask in accordance with a molar ratio of 1:0.6-0.9:0.1-0.4, under conditions of nitrogen atmosphere and atmospheric pressure, stirring in 120-150° C., melting and reacting until difficult to magnetically stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration in 25-40 w/v %;

step 4, mixing and uniformly stirring the first solution and the second solution in accordance with a volume ratio in 100:10-30, to obtain a mixture prepolymer of polymer dispersed liquid crystal and the graphene nanoparticles, polymerizing the polymer dispersed liquid crystal and the graphene nanoparticles at atmospheric pressure and 60-80° C. for 3-7 days, after the ethanol completely evaporated, a PDLC thin film is obtained.

In step 1, the graphene nanoparticles and the liquid crystal are mixed in accordance with the mass ratio in 0.1-5:100.

In step 1, the graphene nanoparticles are obtained by using mechanical exfoliation, redox, silicon carbide epitaxial growth, or chemical vapor deposition.

In step 1, particle sizes of the graphene nanoparticles are in a range of 0 nm-80 nm.

In step 1, the first solution is obtained by using mechanical stirring; in step 2, the prepolymer is obtained by using magnetic stirring; in step 4, the mixture prepolymer of the polymer dispersed liquid and the graphene nanoparticles is obtained by using magnetic stirring.

Step 2 is performed at a constant temperature condition of 140° C.; the round bottom flask used in step 2 is a four-ports round bottom flask.

In step 2, the citric acid, the 1,8-octanediol and the 1,2-propanediol are put into a round bottom flask in accordance with the molar ratio of 1:0.6:0.4, 1:0.7:0.3, 1:0.8:0.2, or 1:0.9:0.1.

The second solution obtained in step 3 has the prepolymer of the mass volume concentration at 33 w/v %.

In step 4, the polymer dispersed liquid crystal and the graphene nanoparticles are polymerized at atmospheric pressure and 70° C. for 5 days, and the PDLC thin film is obtained.

The PDLC thin film has a cross linked network structure inside.

The present application further provides a method of fabricating a PDLC thin film, including steps as follows:

step 1, providing liquid crystal and graphene nanoparticles; mixing and uniformly stirring the graphene nanoparticles and the liquid crystal in accordance with a mass ratio in 0.1-20:100 to obtain a first solution;

step 2, providing citric acid and 1,8-octanediol; putting the citric acid and the 1,8-octanediol into a round bottom flask in accordance with a molar ratio of 1:1, under conditions of nitrogen atmosphere and atmospheric pressure, stirring in 120-150° C., melting and reacting until difficult to magnetically stir, that is, when nearing a gel point, to stop the stirring, to obtain a prepolymer having a certain molecular weight; or providing citric acid, 1,8-octanediol and 1,2-propanediol; putting the citric acid, the 1,8-octanediol and the 1,2-propanediol into a round bottom flask in accordance with a molar ratio of 1:0.6-0.9:0.1-0.4, under conditions of nitrogen atmosphere and atmospheric pressure, stirring in 120-150° C., melting and reacting until difficult to magnetically stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration in 25-40 w/v %;

step 4, mixing and uniformly stirring the first solution and the second solution in accordance with a volume ratio in 100:10-30, to obtain a mixture prepolymer of polymer dispersed liquid crystal and the graphene nanoparticles, polymerizing the polymer dispersed liquid crystal and the graphene nanoparticles at atmospheric pressure and 60-80° C. for 3-7 day;

wherein, in step 1, the graphene nanoparticles and the liquid crystal are mixed in accordance with the mass ratio in 0.1-5:100;

wherein, in step 1, the graphene nanoparticles are obtained by using mechanical exfoliation, redox, silicon carbide epitaxial growth, or chemical vapor deposition;

wherein, in step 1, particle sizes of the graphene nanoparticles are in a range of 0 nm-80 nm;

wherein, in step 1, the first solution is obtained by using mechanical stirring; in step 2, the prepolymer is obtained by using magnetic stirring; in step 4, the mixture prepolymer of the polymer dispersed liquid and the graphene nanoparticles is obtained by using magnetic stirring.

Advantages of the present application are that the method of fabricating the PDLC thin film forms the first solution by mixing the liquid crystal and the graphene nanoparticles; prepares the prepolymer by using the citric acid and the 1,8-octanediol, or the citric acid, the 1,8-octanediol and the 1,8-octanediol; forms the second solution by dissolving the prepolymer in the anhydrous ethanol; then obtains the mixture prepolymer of the polymer dispersed liquid crystal and the graphene nanoparticles by mixing and uniformly stirring the first solution and the second solution; and obtains the PDLC thin film after the mixture prepolymer is polymerized for several days. The present application indirectly changes dielectricity of the polymer matrix by combining the polymer dispersed liquid crystal and the graphene nanoparticles, so as to enhance the response speed of the polymer dispersed liquid crystal, to reduce the driving voltage of the polymer dispersed liquid crystal, to construct a new type of a combination of the liquid crystal and the polymer in the polymer dispersed liquid crystal, and the size and the thickness of the PDLC thin film fabricated by the method of fabricating the PDLC thin film of the present application are adjustable, and applications thereof are convenient.

BRIEF DESCRIPTION OF THE DRAWINGS

The technical features and advantages of the present application will become more readily apparent through the detailed description of embodiments and following accompanying drawings, in which.

DETAILED DESCRIPTION OF PREFERRED EMBODIMENTS

For further illustrating the techniques and effects adopted by the present application, the preferable embodiments of the present application and accompanying drawings will be described in more detail as follows.

Figure 1:
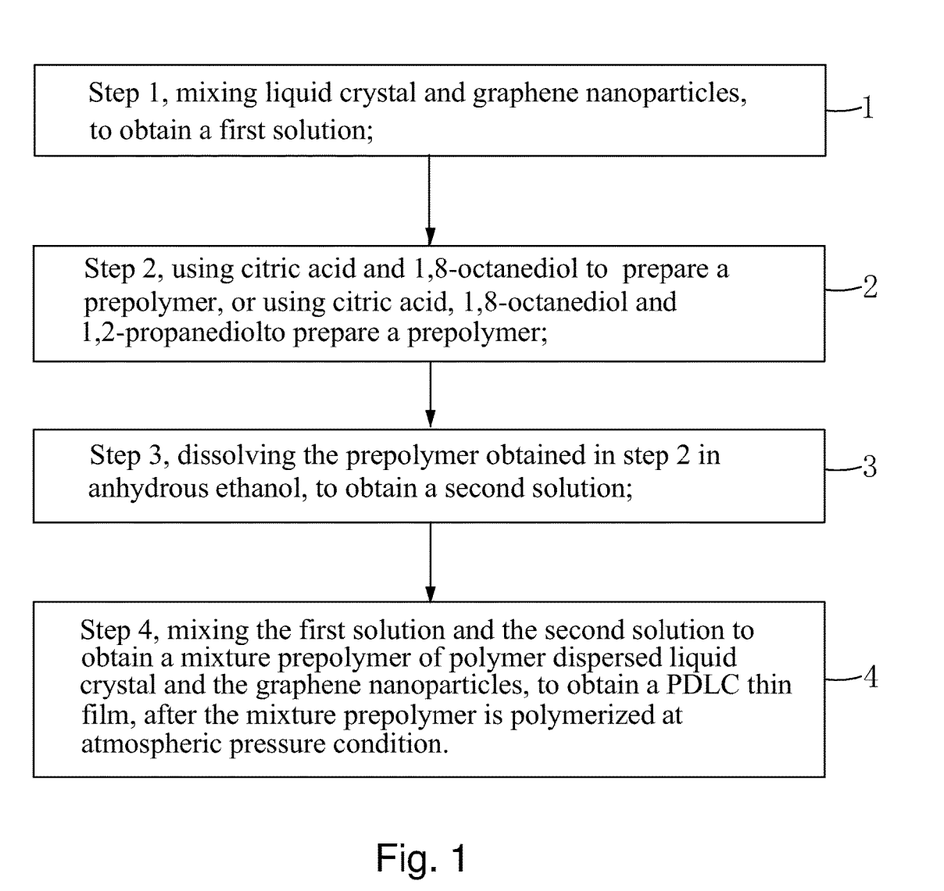
FIG. 1 is a flow chart illustrating a method of fabricating a PDLC thin film of the present application.

Please refer to FIG. 1, the present application provides a method of fabricating a PDLC thin film, including steps as follows.

Figure 2:
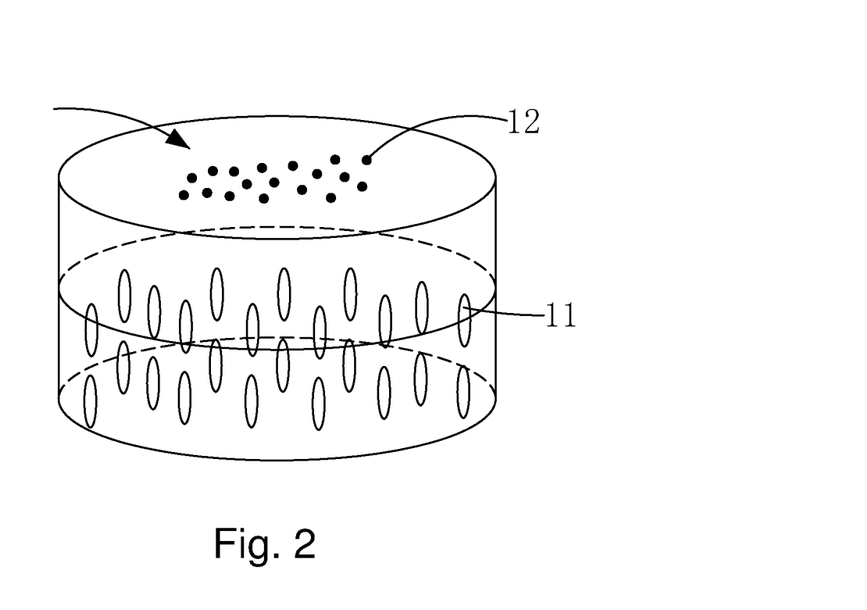
FIGS. 2-3 are schematic diagrams illustrating step 1 of the method of fabricating the PDLC thin film of the present application.
Figure 3:
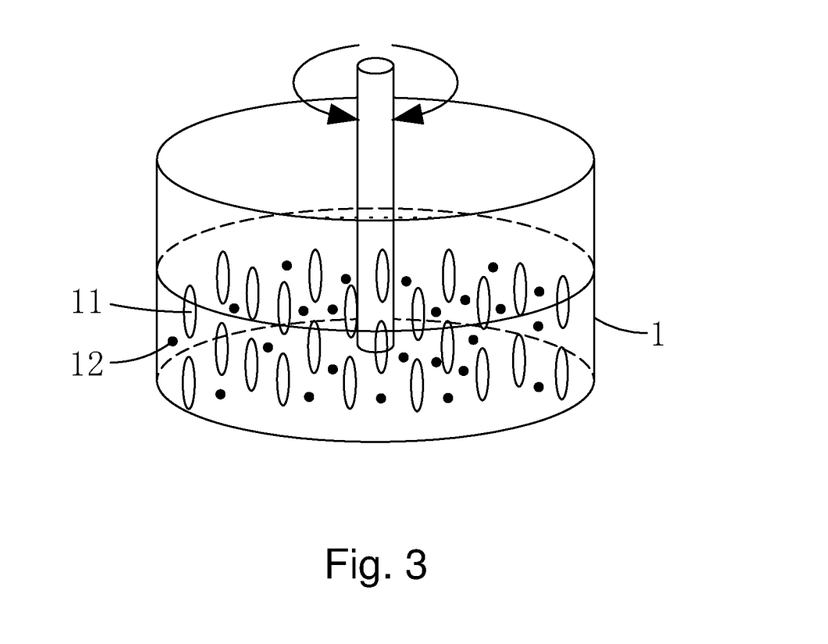

Step 1, as shown in FIGS. 2-3, providing liquid crystal 11 and graphene nanoparticles 12; mixing and uniformly stirring the graphene nanoparticles 12 and the liquid crystal 11 in accordance with a mass ratio in 0.1-20:100 to obtain a first solution 1.

Preferably, the graphene nanoparticles 12 and the liquid crystal 11 are mixed in accordance with the mass ratio in 0.1-5:100.

Specifically, the graphene nanoparticles 12 are obtained by using mechanical exfoliation, redox, silicon carbide epitaxial growth, or chemical vapor deposition.

Specifically, particle sizes of the graphene nanoparticles 12 are in a range of 0 nm-80 nm.

Specifically, in step 1, the first solution 1 is obtained by using mechanical stirring.

Figure 4:
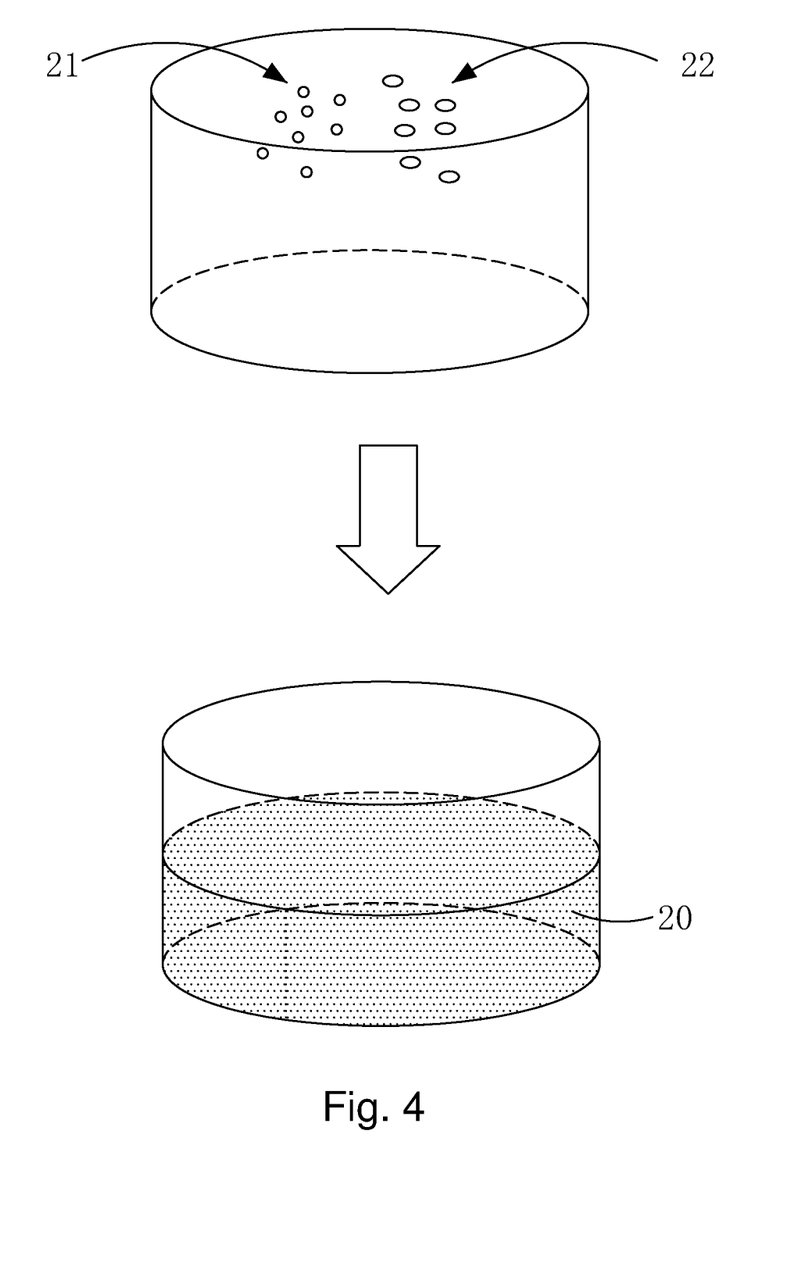
FIGS. 4-5 are schematic diagrams illustrating step 2 of the method of fabricating the PDLC thin film of the present application.
Figure 5:
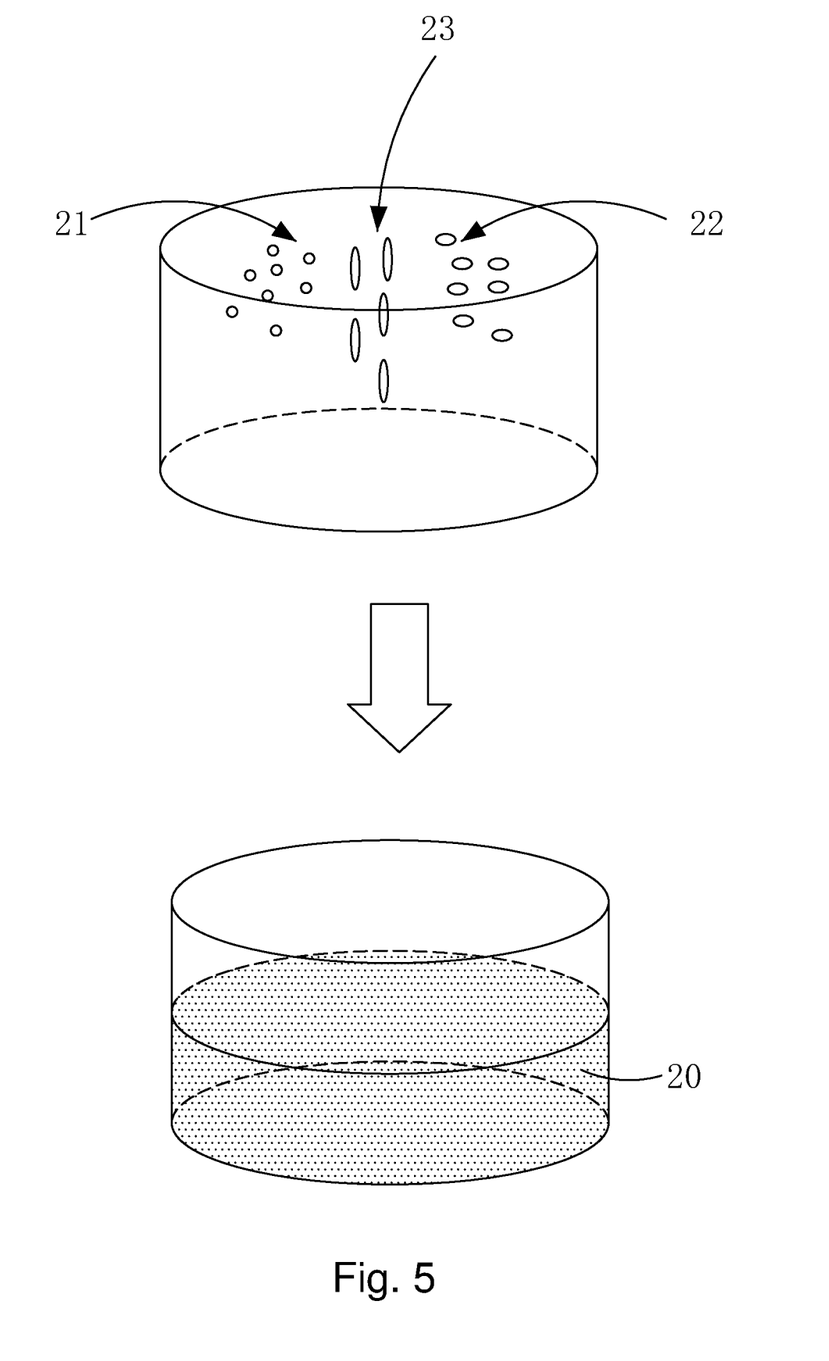

Step 2, as shown in FIG. 4, providing citric acid 21 and 1,8-octanediol 22; putting the citric acid 21 and the 1,8- octanediol 22 into a round bottom flask in accordance with a molar ratio of 1:1, under conditions of nitrogen atmosphere and atmospheric pressure, stirring in 120-150° C., melting and reacting until difficult to magnetically stir, that is, when nearing a gel point, to stop the stirring, to obtain a prepolymer 20 having a certain molecular weight; or as shown in FIG. 5, providing citric acid 21, 1,8-octanediol 22 and 1,2-propanediol 23; putting the citric acid 21, the 1,8-octanediol 22 and the 1,2-propanediol 23 into a round bottom flask in accordance with a molar ratio of 1:0.6-0.9: 0.1-0.4, under conditions of nitrogen atmosphere and atmospheric pressure, stirring in 120-150° C., melting and reacting until difficult to magnetically stir, that is, when nearing a gel point, to stop the stirring, to obtain a prepolymer 20 having a certain molecular weight.

Specifically, in step 2, the prepolymer is obtained by using magnetic stirring.

Preferably, the round bottom flask used in step 2 is a four-ports round bottom flask.

Preferably, step 2 is performed at a constant temperature condition of 140° C.

Preferably, in step 2, the citric acid, the 1,8-octanediol and the 1,2-propanediol are put into a round bottom flask in accordance with the molar ratio of 1:0.6:0.4, 1:0.7:0.3, 1:0.8:0.2, or 1:0.9:0.1.

Step 3, dissolving the prepolymer 20 obtained in step 2 in anhydrous ethanol 30, and uniformly stirring to obtain a second solution 2 having the prepolymer 20 of a mass volume concentration in 25-40 w/v %.

Figure 6:
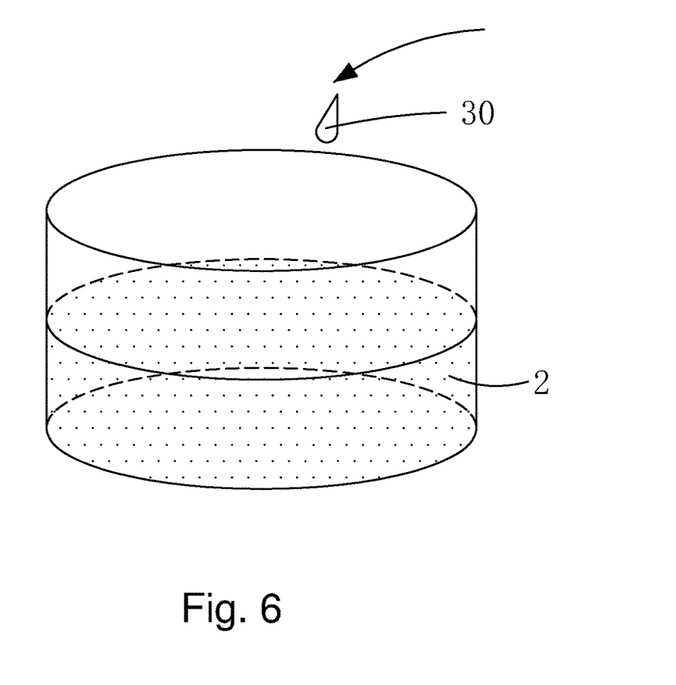
FIG. 6 is a schematic diagram illustrating step 3 of the method of fabricating the PDLC thin film of the present application.
Figure 7:
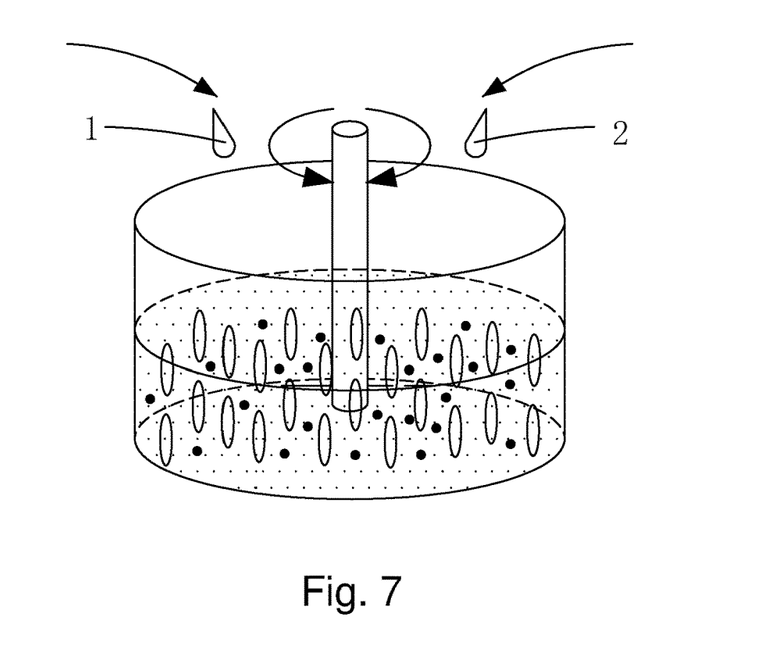
FIG. 7 is a schematic diagram illustrating step 4 of the method of fabricating the PDLC thin film of the present application.

Preferably, the second solution 2 obtained in step 3 has the prepolymer 20 of the mass volume concentration at 33 w/v %.

step 4, as shown in FIG. 6, mixing and uniformly stirring the first solution 1 and the second solution 2 in accordance with a volume ratio in 100:10-30, to obtain a mixture prepolymer of polymer dispersed liquid crystal and the graphene nanoparticles 12, polymerizing the polymer dispersed liquid crystal and the graphene nanoparticles 12 at atmospheric pressure and 60-80° C. for 3-7 days, after the ethanol completely evaporated, a PDLC thin film is obtained.

Specifically, in step 4, the mixture prepolymer of the polymer dispersed liquid and the graphene nanoparticles 12 is obtained by using magnetic stirring.

Preferably, the first solution 1 and the second solution 2 are mixed in accordance with a volume ratio of 100:20.

Preferably, the polymer dispersed liquid crystal and the graphene nanoparticles 12 are polymerized at atmospheric pressure and 70° C. for 5 days, and the PDLC thin film is obtained.

The PDLC thin film fabricated by the method of fabricating the PDLC thin film of the present application is a modified elastomeric polymer film having a certain degree of crosslinking and different molar ratios of monomers, the size and thickness of the PDLC thin film can be set in accordance with the demands and conditions. The PDLC thin film has a cross linked network structure inside, and simultaneously has film-forming plasticity and faster response speed compared to conventional polymer dispersed liquid crystal.

The method of fabricating the PDLC thin film of the present application combined with five embodiments will be detailed and specifically described as follows.

Embodiment 1

A method of fabricating a PDLC thin film includes steps as follows:

step 1, providing liquid crystal and graphene nanoparticles; mixing the graphene nanoparticles and the liquid crystal in accordance with a mass ratio of 0.1:100, uniformly mixing by mechanical stirring, to obtain a first solution, wherein the particle sizes of the graphene nanoparticles are 0.1 nm;

step 2, providing citric acid and 1,8-octanediol; putting the citric acid and the 1,8-octanediol into a four-ports round bottom flask in accordance with a molar ratio of 1:1, under conditions of nitrogen atmosphere and atmospheric pressure, magnetically stirring at a constant temperature of 120° C., melting and reacting until difficult to stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration of 25 w/v %;

step 4, mixing the first solution and the second solution in accordance with a volume ratio of 100:10, uniformly mixing by using magnetic stirring, to obtain a mixture prepolymer of polymer dispersed liquid crystal and the graphene nanoparticles, polymerizing the polymer dispersed liquid crystal and the graphene nanoparticles at atmospheric pressure and 60° C. for 7 days, after the ethanol completely evaporated, a PDLC thin film is obtained.

Embodiment 2

A method of fabricating a PDLC thin film includes steps as follows:

step 1, providing liquid crystal and graphene nanoparticles; mixing the graphene nanoparticles and the liquid crystal in accordance with a mass ratio of 5:100, uniformly mixing by mechanical stirring, to obtain a first solution, wherein the particle sizes of the graphene nanoparticles are 20 nm;

step 2, providing citric acid, 1,8-octanediol and 1,2-propanediol; putting the citric acid, the 1,8-octanediol and the 1,2-propanediol into a four-ports round bottom flask in accordance with a molar ratio of 1:0.6:0.4, under conditions of nitrogen atmosphere and atmospheric pressure, magnetically stirring at a constant temperature of 130° C., melting and reacting until difficult to magnetically stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration of 30 w/v %;

step 4, mixing the first solution and the second solution in accordance with a volume ratio of 100:15, uniformly mixing by using magnetic stirring, to obtain a mixture prepolymer of polymer dispersed liquid crystal and the graphene nanoparticles, polymerizing the polymer dispersed liquid crystal and the graphene nanoparticles at atmospheric pressure and 70° C. for 5 days, after the ethanol completely evaporated, a PDLC thin film is obtained.

Embodiment 3

A method of fabricating a PDLC thin film includes steps as follows:

step 1, providing liquid crystal and graphene nanoparticles; mixing and uniformly stirring the graphene nanoparticles and the liquid crystal in accordance with a mass ratio of 10:100, uniformly mixing by mechanical stirring, to obtain a first solution, wherein the particle sizes of the graphene nanoparticles are 40 nm;

step 2, providing citric acid, 1,8-octanediol and 1,2-propanediol; putting the citric acid, the 1,8-octanediol and the 1,2-propanediol into a four-ports round bottom flask in accordance with a molar ratio of 1:0.7:0.3, under conditions of nitrogen atmosphere and atmospheric pressure, magnetically stirring at a constant temperature of 140° C., melting and reacting until difficult to magnetically stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration of 33 w/v %;

step 4, mixing the first solution and the second solution in accordance with a volume ratio of 100:20, uniformly mixing by using magnetic stirring, to obtain a mixture prepolymer of polymer dispersed liquid crystal and the graphene nanoparticles, polymerizing the polymer dispersed liquid crystal and the graphene nanoparticles at atmospheric pressure and 80° C. for 3 days, after the ethanol completely evaporated, a PDLC thin film is obtained.

Embodiment 4

A method of fabricating a PDLC thin film includes steps as follows:

step 1, providing liquid crystal and graphene nanoparticles; mixing and uniformly stirring the graphene nanoparticles and the liquid crystal in accordance with a mass ratio of 15:100, uniformly mixing by mechanical stirring, to obtain a first solution, wherein the particle sizes of the graphene nanoparticles are 60 nm;

step 2, providing citric acid, 1,8-octanediol and 1,2-propanediol; putting the citric acid, the 1,8-octanediol and the 1,2-propanediol into a four-ports round bottom flask in accordance with a molar ratio of 1:0.8:0.2, under conditions of nitrogen atmosphere and atmospheric pressure, magnetically stirring at a constant temperature of 150° C., melting and reacting until difficult to magnetically stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration of 35 w/v %;

step 4, mixing the first solution and the second solution in accordance with a volume ratio of 100:25, uniformly mixing by using magnetic stirring, to obtain a mixture prepolymer of polymer dispersed liquid crystal and the graphene nanoparticles, polymerizing the polymer dispersed liquid crystal and the graphene nanoparticles at atmospheric pressure and 65° C. for 7 days, after the ethanol completely evaporated, a PDLC thin film is obtained.

Embodiment 4

A method of fabricating a PDLC thin film includes steps as follows:

step 1, providing liquid crystal and graphene nanoparticles; mixing and uniformly stirring the graphene nanoparticles and the liquid crystal in accordance with a mass ratio of 20:100, uniformly mixing by mechanical stirring, to obtain a first solution, wherein the particle sizes of the graphene nanoparticles are 80 nm;

step 2, providing citric acid, 1,8-octanediol and 1,2-propanediol; putting the citric acid, the 1,8-octanediol and the 1,2-propanediol into a four-ports round bottom flask in accordance with a molar ratio of 1:0.9:0.1, under conditions of nitrogen atmosphere and atmospheric pressure, magnetically stirring at a constant temperature of 140° C., melting and reacting until difficult to magnetically stir, that is, when nearing a gel point, to stop the stirring, to obtain a prepolymer having a certain molecular weight;

step 3, dissolving the prepolymer obtained in step 2 in anhydrous ethanol, and uniformly stirring to obtain a second solution having the prepolymer of a mass volume concentration of 40 w/v %;

step 4, mixing the first solution and the second solution in accordance with a volume ratio of 100:30, uniformly mixing by using magnetic stirring, to obtain a mixture prepolymer of polymer dispersed liquid crystal and the graphene nanoparticles, polymerizing the polymer dispersed liquid crystal and the graphene nanoparticles at atmospheric pressure and 75° C. for 4 days, after the ethanol completely evaporated, a PDLC thin film is obtained.

In summary, the method of fabricating the PDLC thin film forms the first solution by mixing the liquid crystal and the graphene nanoparticles; prepares the prepolymer by using the citric acid and the 1,8-octanediol, or the citric acid, the 1,8-octanediol and the 1,8-octanediol; forms the second solution by dissolving the prepolymer in the anhydrous ethanol; then obtains the mixture prepolymer of the polymer dispersed liquid crystal and the graphene nanoparticles by mixing and uniformly stirring the first solution and the second solution; and obtains the PDLC thin film after the mixture prepolymer is polymerized for several days. The present application indirectly changes dielectricity of the polymer matrix by combining the polymer dispersed liquid crystal and the graphene nanoparticles, so as to enhance the response speed of the polymer dispersed liquid crystal, to reduce the driving voltage of the polymer dispersed liquid crystal, to construct a new type of a combination of the liquid crystal and the polymer in the polymer dispersed liquid crystal, and the size and the thickness of the PDLC thin film fabricated by the method of fabricating the PDLC thin film of the present application are adjustable, and applications thereof are convenient.

To those ordinarily skilled in the art, the above description is intended to cover various modifications and similar arrangements according to the technical solution and spirit of the present application, and the various modifications and similar arrangements are included within the spirit and scope of the appended claims of the present application.

What is claimed is:

1. A method of fabricating a polymer dispersed liquid crystal (PDLC) thin film, comprising steps as follows:

step 1, providing liquid crystal and graphene nanoparticles; mixing and uniformly stirring the graphene nanoparticles and the liquid crystal in accordance with a mass ratio in 0.1-20:100 to obtain a first solution;

step 2, providing citric acid and 1,8-octanediol; putting the citric acid and the 1,8-octanediol into a round bottom flask in accordance with a molar ratio of 1:1, in conditions of nitrogen atmosphere and atmospheric pressure, stirring in 120-150° C., melting and reacting until difficult to magnetically stir, that is, when nearing a gel point, to stop the stirring, to obtain a prepolymer; or providing citric acid, 1,8-octanediol and 1,2-propanediol; putting the citric acid, the 1,8-octanediol and the 1,2-propanediol into a round bottom flask in accordance with a molar ratio of 1:0.6-0.9:0.1-0.4, in conditions of nitrogen atmosphere and atmospheric pressure, stirring in 120-150° C., melting and reacting until difficult to magnetically stir, that is, when nearing a gel point, to stop the stirring, to obtain a prepolymer;

step 3, dissolving the prepolymer obtained in step 2 in anhydrous ethanol, and uniformly stirring to obtain a second solution having the prepolymer of a mass volume concentration in 25-40 w/v %;

step 4, mixing and uniformly stirring the first solution and the second solution in accordance with a volume ratio in 100:10-30, to obtain a mixture prepolymer of polymer dispersed liquid crystal and the graphene nanoparticles, polymerizing the polymer dispersed liquid crystal and the graphene nanoparticles at atmospheric pressure and 60-80° C. for 3-7 days, after the ethanol completely evaporated, a polymer dispersed liquid crystal (PDLC) thin film is obtained.

2. The method of fabricating the PDLC thin film according to claim 1, wherein, in step 1, the graphene nanoparticles and the liquid crystal are mixed in accordance with the mass ratio in 0.1-5:100.

3. The method of fabricating the PDLC thin film according to claim 1, wherein, in step 1, the graphene nanoparticles are obtained by using mechanical exfoliation, redox, silicon carbide epitaxial growth, or chemical vapor deposition.

4. The method of fabricating the PDLC thin film according to claim 1, wherein, in step 1, particle sizes of the graphene nanoparticles are in a range of 0.1 nm-80 nm.

5. The method of fabricating the PDLC thin film according to claim 1, wherein, in step 1, the first solution is obtained by using mechanical stirring; in step 2, the prepolymer is obtained by using magnetic stirring; in step 4, the mixture prepolymer of the polymer dispersed liquid crystal and the graphene nanoparticles is obtained by using magnetic stirring.

6. The method of fabricating the PDLC thin film according to claim 1, wherein step 2 is performed in a condition of constant temperature 140° C.; the round bottom flask used in step 2 is a four-ports round bottom flask.

7. The method of fabricating the PDLC thin film according to claim 1, wherein, in step 2, the citric acid, the 1,8-octanediol and the 1,2-propanediol are put into a round bottom flask in accordance with the molar ratio of 1:0.6:0.4, 1:0.7:0.3, 1:0.8:0.2, or 1:0.9:0.1.

8. The method of fabricating the PDLC thin film according to claim 1, wherein the second solution obtained in step 3 has the prepolymer of the mass volume concentration at 33 w/v %.

9. The method of fabricating the PDLC thin film according to claim 1, wherein, in step 4, the polymer dispersed liquid crystal and the graphene nanoparticles are polymerized at atmospheric pressure and 70° C. for 5 days, and the PDLC thin film is obtained.

10. The method of fabricating the PDLC thin film according to claim 1, wherein the PDLC thin film has a cross linked network structure inside.

11. A method of fabricating a polymer dispersed liquid crystal (PDLC) thin film, comprising steps as follows:

step 1, providing liquid crystal and graphene nanoparticles; mixing and uniformly stirring the graphene nanoparticles and the liquid crystal in accordance with a mass ratio in 0.1-5:100 to obtain a first solution;

step 2, providing citric acid and 1,8-octanediol; putting the citric acid and the 1,8-octanediol into a round bottom flask in accordance with a molar ratio of 1:1, in conditions of a nitrogen atmosphere and atmospheric pressure, stirring in 120-150° C., melting and reacting until difficult to magnetically stir, that is, when nearing a gel point, to stop the stirring to obtain a prepolymer; or providing citric acid, 1,8-octanediol and 1,2-propanediol; putting the citric acid, the 1,8-octanediol and the 1,2-propanediol into a round bottom flask in accordance with a molar ratio of 1:0.6-0.9:0.1-0.4, in conditions of nitrogen atmosphere and atmospheric pressure, stirring in 120-150° C., melting and reacting until difficult to magnetically stir, that is, when nearing a gel point, to stop the stirring, to obtain a prepolymer;

step 3, dissolving the prepolymer obtained in step 2 in anhydrous ethanol, and uniformly stirring to obtain a second solution having the prepolymer of a mass volume concentration in 25-40 w/v %;

step 4, mixing and uniformly stirring the first solution and the second solution in accordance with a volume ratio in 100:10-30, to obtain a mixture prepolymer of polymer dispersed liquid crystal and the graphene nanoparticles, polymerizing the polymer dispersed liquid crystal and the graphene nanoparticles at atmospheric pressure and 60-80° C. for 3-7 days, after the ethanol completely evaporated, a polymer dispersed liquid crystal (PDLC) thin film is obtained;

wherein, in step 1, the graphene nanoparticles is obtained by using mechanical exfoliation, redox, silicon carbide epitaxial growth, or chemical vapor deposition;

wherein, in step 1, particle sizes of the graphene nanoparticles are in a range of 0.1 nm-80 nm;

wherein, in step 1, the first solution is obtained by using mechanical stirring; in step 2, the prepolymer is obtained by using magnetic stirring; in step 4, the mixture prepolymer of the polymer dispersed liquid crystal and the graphene nanoparticles are obtained by using magnetic stirring.

12. The method of fabricating the PDLC thin film according to claim 11, wherein step 2 is performed at a constant temperature condition of 140° C.; the round bottom flask used in step 2 is a four-ports round bottom flask.

13. The method of fabricating the PDLC thin film according to claim 11, wherein, in step 2, the citric acid, the 1,8-octanediol and the 1,2-propanediol are put into a round bottom flask in accordance with the molar ratio of 1:0.6:0.4, 1:0.7:0.3, 1:0.8:0.2, or 1:0.9:0.1.

14. The method of fabricating the PDLC thin film according to claim 11, wherein the second solution obtained in step 3 has the prepolymer of the mass volume concentration at 33 w/v %.

15. The method of fabricating the PDLC thin film according to claim 11, wherein, in step 4, the polymer dispersed liquid crystal and the graphene nanoparticles are polymerized at atmospheric pressure and 70° C. for 5 days, and the PDLC thin film is obtained.

16. The method of fabricating the PDLC thin film according to claim 11, wherein the PDLC thin film has a cross linked network structure inside.

* * * * *